US007684376B2

(12) United States Patent
Akaiwa

(10) Patent No.: US 7,684,376 B2
(45) Date of Patent: Mar. 23, 2010

(54) SEARCH METHOD FOR RADIO LAN TERMINAL, SEARCH SYSTEM FOR RADIO LAN TERMINAL USING THE SEARCH METHOD, AND COMPUTER READABLE MEDIUM HAVING SEARCH PROGRAM FOR RADIO LAN TERMINAL

(75) Inventor: Shoichi Akaiwa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 950 days.

(21) Appl. No.: 11/327,322

(22) Filed: Jan. 9, 2006

(65) Prior Publication Data
US 2006/0253488 A1 Nov. 9, 2006

(30) Foreign Application Priority Data
Jan. 11, 2005 (JP) ............................. 2005-003422

(51) Int. Cl.
*H04W 4/00* (2009.01)
*H04B 17/00* (2006.01)
(52) U.S. Cl. .................................... 370/338; 455/67.11
(58) Field of Classification Search .............. 455/67.11, 455/423; 370/332, 338
See application file for complete search history.

(56) References Cited

U.S. PATENT DOCUMENTS
7,039,445 B1 5/2006 Yoshizawa
(Continued)

FOREIGN PATENT DOCUMENTS
EP 1 416 677 A1 5/2004
(Continued)

*Primary Examiner*—Nick Corsaro
*Assistant Examiner*—Michael Faragalla
(74) *Attorney, Agent, or Firm*—Oliff & Berridge, PLC

(57) ABSTRACT

A search system for a radio LAN terminal includes: plural terminals; and a search computer that searches for connectable terminals out of the plural terminals in a radio LAN, wherein the search computer includes: a communication unit provided to be capable of changing transmission power of radio communication for performing radio communication via the radio LAN with the plural terminals; and a storage unit that stores a search list in which identification information including identifiers for identifying the searched terminals are listed according to an order of the searched terminals, the plural terminals include terminal communication units for performing radio communication with the search computer via the radio LAN, the search computer broadcasts a probe request for searching for the terminals by minimizing a set value of the transmission power of the radio communication of the communication unit, the terminals having received the probe request transmit response signals including the identification information of the terminals from the terminal communication units to the search computer, the search computer checks whether the response signals received are response signals from new ones of the terminals not stored in the search list, the search computer adds, when the response signals are response signals from the new terminals, the identification information included in the response signals to the search list of the storage unit, and the search computer performs, when the response signals are not response signals from the new terminals or the response signals are not received, a series of search operations starting from the probe request by increasing the set value of the transmission power of the radio communication of the communication unit.

6 Claims, 7 Drawing Sheets

U.S. PATENT DOCUMENTS

| | | |
|---|---|---|
| 2004/0203359 A1 | 10/2004 | Sasai et al. |
| 2004/0203435 A1* | 10/2004 | Karlquist et al. ......... 455/67.11 |
| 2006/0092855 A1 | 5/2006 | Chiu |

FOREIGN PATENT DOCUMENTS

| | | | |
|---|---|---|---|
| JP | A-2001-144781 | | 5/2001 |
| JP | A-2003-110495 | | 4/2003 |
| JP | A 2004-200830 | | 7/2004 |
| WO | WO/2004/079919 | | 9/2004 |
| WO | WO 2004/079919 | * | 9/2004 |
| WO | WO 2004/079919 A | | 9/2004 |

* cited by examiner

BROADCAST IN FIRST TIME
(FIELD INTENSITY IS MINIMUM)

BROADCAST IN SECOND TIME
(FIELD INTENSITY IS INCREASED
BY ONE STAGE)

SEARCH METHOD FOR RADIO LAN TERMINAL, SEARCH SYSTEM FOR RADIO LAN TERMINAL USING THE SEARCH METHOD, AND COMPUTER READABLE MEDIUM HAVING SEARCH PROGRAM FOR RADIO LAN TERMINAL

CROSS REFERENCE TO RELATED APPLICATION

The present application claims priority to Japanese Patent Application No. 2005-003422 filed on Jan. 11, 2005 in Japan, which is hereby expressly incorporated by reference herein in its entirety.

BACKGROUND

The present invention related to a search method for a radio LAN terminal, a search system for a radio LAN terminal using the search method, and a search program for a radio LAN terminal for searching for, in a radio LAN including a personal computer (PC) and plural apparatuses and terminals (hereinafter referred to as "terminals") such as a projector capable of communicating with the PC by radio, a desired terminal among the plural terminals.

For example, in a node selection system described in JP-A-2004-200830 that is a type of the search system for a radio LAN terminal, all the terminals such as the projector always advertise identifiers such as IP addresses of the terminals one another with radio signals of an identical field intensity using radio LAN apparatuses for identifier advertisement attached to the terminals to allow a search PC for searching for a terminal to search for a nearest terminal. The search PC measures field intensities of radio signals transmitted from the respective terminals and makes connection to the terminal transmitting the radio signal with the highest filed intensity. All the terminals continue to always advertise the identifiers even after the search PC makes connection to the nearest terminal.

In another node selection system (no publicly known document), a search PC is capable of displaying terminals capable of making connection to the PC via a radio LAN in a form of a random list not including information on distances to the terminals.

However, in the node selection system described in JP-A-2004-200830, on the premise that field intensities of radio signals transmitted by the respective terminals are identical, the search PC searches for a nearest terminal according to strength of radio waves always outputted. Thus, the radio LAN apparatuses for identifier advertisement having identical radio power and capable of always transmitting identifiers have to be attached to all the terminals. Usually, the terminals make connection to the radio LAN by having general-purpose radio LAN cards or the like conforming to a radio LAN standard such as IEEE 802.11b (IEEE 802.11 High-Rate Direct Sequence) inserted therein. These radio LAN cards are manufactured by plural manufacturers. There are plural models even if a manufacturer is identical. Thus, it is difficult to set the radio LAN card to always transmit identifiers at an identical field intensity because of fluctuation in manufacturing and a difference of specifications. Consequently, the node selection system requires dedicated apparatuses, that is, the radio LAN apparatuses for identifier advertisement, as components of the terminals. Thus, it is difficult to add terminals having the general-purpose radio LAN cards inserted therein to the node selection system. The node selection system is a closed system poor in compatibility.

All the plural terminals have to always communicate identifiers of the terminals to the search PC by radio to allow the search PC to search for a nearest one terminal. Moreover, even after the search PC makes connection to the nearest one terminal, the remaining terminals always communicate the identifiers of the terminals to the search PC by radio.

As described above, in the node selection system in the past, since all the plural terminals always communicate with the search PC by radio, power consumption is large.

Since the list of the connectable terminals displayed by the search PC is a random list, information concerning which terminal is located nearest to the search PC is not included in the list.

Therefore, since a user has to search a nearest terminal out of the random list by referring to model numbers or the like of the terminals, search efficiency is not high.

SUMMARY

An advantage of some aspects of the invention is to provide a search system for a radio LAN terminal rich in compatibility that can efficiently search for a nearest terminal out of plural terminals with less power consumption and a search method for a radio LAN terminal and a search program for a radio LAN terminal that can efficiently search for a nearest terminal out of plural terminals.

According to a first aspect of the invention, there is provided a search system for a radio LAN terminal including: plural terminals; and a search computer that searches for connectable terminals out of the plural terminals in a radio LAN. The search computer includes: a communication unit provided to be capable of changing transmission power of radio communication for performing radio communication via the radio LAN with the plural terminals; and a storage unit that stores a search list in which identification information including identifiers for identifying the searched terminals are listed according to an order of the searched terminals. The plural terminals include terminal communication units for performing radio communication with the search computer via the radio LAN. The search computer broadcasts a probe request for searching for the terminals by minimizing a set value of the transmission power of the radio communication of the communication unit. The terminals having received the probe request transmit response signals including the identification information of the terminals from the terminal communication units to the search computer. The search computer checks whether the response signals received are response signals from new ones of the terminals not stored in the search list. When the response signals are response signals from the new terminals, the search computer adds the identification information included in the response signals to the search list of the storage unit. When the response signals are not response signals from the new terminals or the response signals are not received, the search computer performs a series of search operations starting from the probe request by increasing the set value of the transmission power of the radio communication of the communication unit.

According to the search system for a radio LAN terminal, the plural terminals include the terminal communication units capable of communicating with the search computer by radio via the radio LAN. Thus, the search system for a radio LAN terminal does not require a dedicated apparatus unlike the terminal for the node search system in the past that requires the dedicated radio LAN apparatuses for identifier advertisement in all the terminals.

Therefore, since it is possible to add a terminal including a general-purpose terminal communication unit capable of making connection to the radio LAN to the search system, the search system for a radio LAN terminal is rich in compatibility.

The search computer broadcasts a probe request for searching for the terminals by minimizing a set value of the transmission power of the radio communication. When the response signals from the new terminals are not received or the response signals are not received, the search computer broadcasts the probe request by increasing the set value of the transmission power of the radio communication of the communication unit. Thus, the search computer searches for connectable terminals with a search range expanded by increasing the transmission power of the radio communication.

Since the terminals respond when the probe request is received, the terminals respond in order from one nearest to the search computer as a reaching range of the probe request is expanded.

Therefore, it is possible to efficiently search for a terminal nearest to the search computer.

The search list is a list in which the searched terminals are listed according to an order of the searched terminals. Thus, unlike the random list not including position information of the node search system in the past, the terminals are listed in order from one nearest to the search computer.

Therefore, it is possible to efficiently search for a terminal nearest to the search computer.

The search system sends a probe request only from the search computer at the time of search. Thus, unlike the node selection system in the past in which all the plural terminals always communicate by radio, power consumption is less.

Therefore, it is possible to provide a search system for a radio LAN terminal rich in compatibility that can efficiently search for a nearest terminal out of plural terminals with less power consumption.

It is preferable that the search computer further includes a display unit that displays the search list and the search computer displays the search list on the display unit.

According to the search system for a radio LAN terminal, the display unit of the search computer displays the search list. Thus, it is possible to visually recognize the search list in which the searched terminals are listed in order from one nearest to the search computer.

Therefore, it is possible to provide a search system for a radio LAN terminal that can efficiently search for a terminal nearest to the search computer out of the plural terminals.

It is preferable that, when the number of searched terminals in the search list is one, the search computer broadcasts a probe request by increasing the set value of the transmission power of the radio communication of the communication unit by one stage and, when the response signals are not response signals from new ones of the terminals or the response signals are not received, the search computer makes connection to the terminals stored in the search list via the radio LAN.

According to the search system for a radio LAN terminal, when there is one connectable terminal, the search computer sends a probe request by increasing the transmission power of the radio communication by one stage and, when the response signals are not response signals from new ones of the terminals or the response signals are not received, makes connection to the one terminal. Thus, the search computer makes connection when the search computer can surely limit a terminal nearest to the search computer.

Therefore, it is possible to provide a search system for a radio LAN terminal that can surely search for a nearest terminal out of the plural terminals and make connection to the terminal.

According to a second aspect of the invention, there is provided a search method for a radio LAN terminal for searching for connectable terminals out of plural terminals in a radio LAN. The search method for a radio LAN terminal includes: setting transmission power of radio communication for searching for the terminals; searching for the terminals by broadcasting a probe request for searching for the terminals at the transmission power set in the radio power setting step; checking whether response signals indicating that terminals are connectable sent from the terminals responding to the probe request transmitted in the searching step are response signals from new ones of the terminals not stored in a search list in which the searched terminals are listed; and additionally listing, when the response signals are response signals from the new terminals in the new terminal checking step, identification information included in the response signals for identifying the responding new terminals in the search list. In the radio power setting step and the searching step, the probe request is started from a minimum set value of the transmission power of the radio communication. In the new terminal checking step, when the response signals responding to the probe request transmitted in the searching step are not response signals from new ones of the terminals or the response signals are not received, a series of search operations starting from the searching step are performed by increasing the set value of the transmission power of the radio communication in the radio power setting step.

According to the search method for a radio LAN terminal, in the radio power setting step and the searching step, the probe request is started from a minimum set value of the transmission power of the radio communication and, in the new terminal checking step, when the response signals responding to the probe request transmitted in the searching step are not response signals from new ones of the terminals or the response signals are not received, a series of search operations starting from the searching step are performed by increasing the set value of the transmission power of the radio communication in the radio power setting step. Thus, connectable terminals are searched for by expanding a search range of the terminals.

Since the terminals respond when the probe request is received, the terminals respond in order from one nearest to the search computer as a reaching range of the probe request is expanded.

Therefore, it is possible to provide a search method for a radio LAN terminal that can efficiently search for a nearest terminal out of plural terminals.

It is preferable that the search list is a list in which pieces of identification information indicating the searched terminals are listed according to an order of the searched terminals.

According to the search method for a radio LAN terminal, the search list is a list in which pieces of identification information indicating the searched terminals are listed according to an order of the searched terminals. Thus, the search list is a list in which the terminals are listed in order from a nearest terminal unlike the random list not including position information of the node search system in the past.

Therefore, it is possible to provide a search system for a radio LAN terminal that can efficiently search for a nearest terminal out of plural terminals.

It is preferable that the search method for a radio LAN terminal further includes making connection to the terminals stored in the search list via the radio LAN. When the number of the searched terminals in the search list is one in the listing step, in the radio power setting step and the searching step, the probe request is broadcasted by setting the transmission power of the radio communication higher by one stage. In the new terminal checking step, it is checked whether the response signals from the terminals responding to the probe request transmitted in the searching step are response signals from new ones of the terminals not stored in the search list. The connection step is performed when the response signals are not response signals from the new terminals or the response signals are not received.

According to the search method for a radio LAN terminal, when the number of the connectable terminals in the search list is one, in the radio power setting step and the searching step, the probe request is sent by setting the transmission power of the radio communication higher by one stage. In the new terminal checking step, it is checked whether response signals from new ones of the terminals are received and, when the response signals are not responses signals from the new terminals or the response signals are not received, connection is made to the terminals in the search list via the radio LAN in the connection step. Thus, connection is made when a nearest terminal can be surely limited.

Therefore, it is possible to provide a search method for a radio LAN terminal that can surely search for a nearest terminal out of plural terminals and make connection to the terminal.

According to a third aspect of the invention, there is provided a search program for a radio LAN terminal that is, in a radio LAN system including plural terminals and a search computer that searches for connectable terminals out of the plural terminals, executed by the search computer. The search program for a radio LAN terminal includes: setting transmission power of radio communication of a communication unit that performs radio communication with the terminals; searching for the terminals by broadcasting a probe request for a communication unit to search for the terminals at the transmission power set in the radio power setting step; checking whether response signals indicating that terminals are connectable sent from the terminals responding to the probe request transmitted in the searching step are response signals from new ones of the terminals not stored in a search list of a storage unit in which the searched terminals are listed; and additionally listing, when the response signals are response signals from the new terminals in the new terminal checking step, identification information included in the response signals for identifying the responding new terminals in the search list. In the radio power setting step and the searching step, the probe request is started from a minimum set value of the transmission power of the radio communication. In the new terminal checking step, when the response signals responding to the probe request transmitted in the searching step are not response signals from new ones of the terminals or the response signals are not received, a series of search operations starting from the searching step are performed by increasing the set value of the transmission power of the radio communication in the radio power setting step.

According to the search program for a radio LAN terminal, in the radio power setting step and the searching step, the probe request is started from a minimum set value of the transmission power of the radio communication and, in the new terminal checking step, when the response signals responding to the probe request transmitted in the searching step are not response signals from new ones of the terminals or the response signals are not received, a series of search operations starting from the searching step are performed by increasing the set value of the transmission power of the radio communication in the radio power setting step. Thus, connectable terminals are searched for by expanding a search range of the terminals.

Since the terminals respond when the probe request is received, the terminals respond in order from one nearest to the search computer as a reaching range of the probe request is expanded.

Therefore, it is possible to provide a search program for a radio LAN terminal that can efficiently search for a nearest terminal out of plural terminals.

It is preferable that the search list is a list in which pieces of identification information indicating the searched terminals are listed according to an order of the searched terminals.

According to the search program for a radio LAN terminal, the search list is a list in which pieces of identification information indicating the searched terminals are listed according to an order of the searched terminals. Thus, the search list is a list in which the terminals are listed in order from a terminal nearest to the search computer unlike the random list not including position information of the node search system in the past.

Therefore, it is possible to provide a search program for a radio LAN terminal that can efficiently search for a nearest terminal out of plural terminals.

It is preferable that the search program for a radio LAN terminal further includes making connection to the terminals stored in the search list with the communication unit via the radio LAN. When the number of the searched terminals in the search list is one in the listing step, in the radio power setting step and the searching step, the probe request is broadcasted by setting the transmission power of the radio communication higher by one stage with the communication unit. In the new terminal checking step, it is checked whether the response signals from the terminals responding to the probe request transmitted in the searching step are response signals from new ones of the terminals not stored in the search list. The connection step is performed when the response signals are not response signals from the new terminals or the response signals are not received.

According to the search program for a radio LAN terminal, when the number of the connectable terminals in the search list is one, in the radio power setting step and the searching step, the probe request is sent by setting the transmission power of the radio communication higher by one stage with the communication unit. In the new terminal checking step, it is checked whether response signals from new ones of the terminals are received and, when the response signals are not responses signals from the new terminals or the response signals are not received, connection is made to the terminals in the search list via the radio LAN in the connection step. Thus, connection is made when a terminal nearest to the search computer can be surely limited.

Therefore, it is possible to provide a search program for a radio LAN terminal that can surely search for a nearest terminal out of plural terminals and make connection to the terminal.

BRIEF DESCRIPTION OF THE DRAWINGS

The invention will be described with reference to the accompanying drawings, wherein like numbers reference like elements.

DETAILED DESCRIPTION OF EMBODIMENTS

Embodiments of the invention will be hereinafter explained in detail with reference to the accompanying drawings.

First Embodiment

Schematic constitution of a search system for a radio LAN terminal

Figure 1:
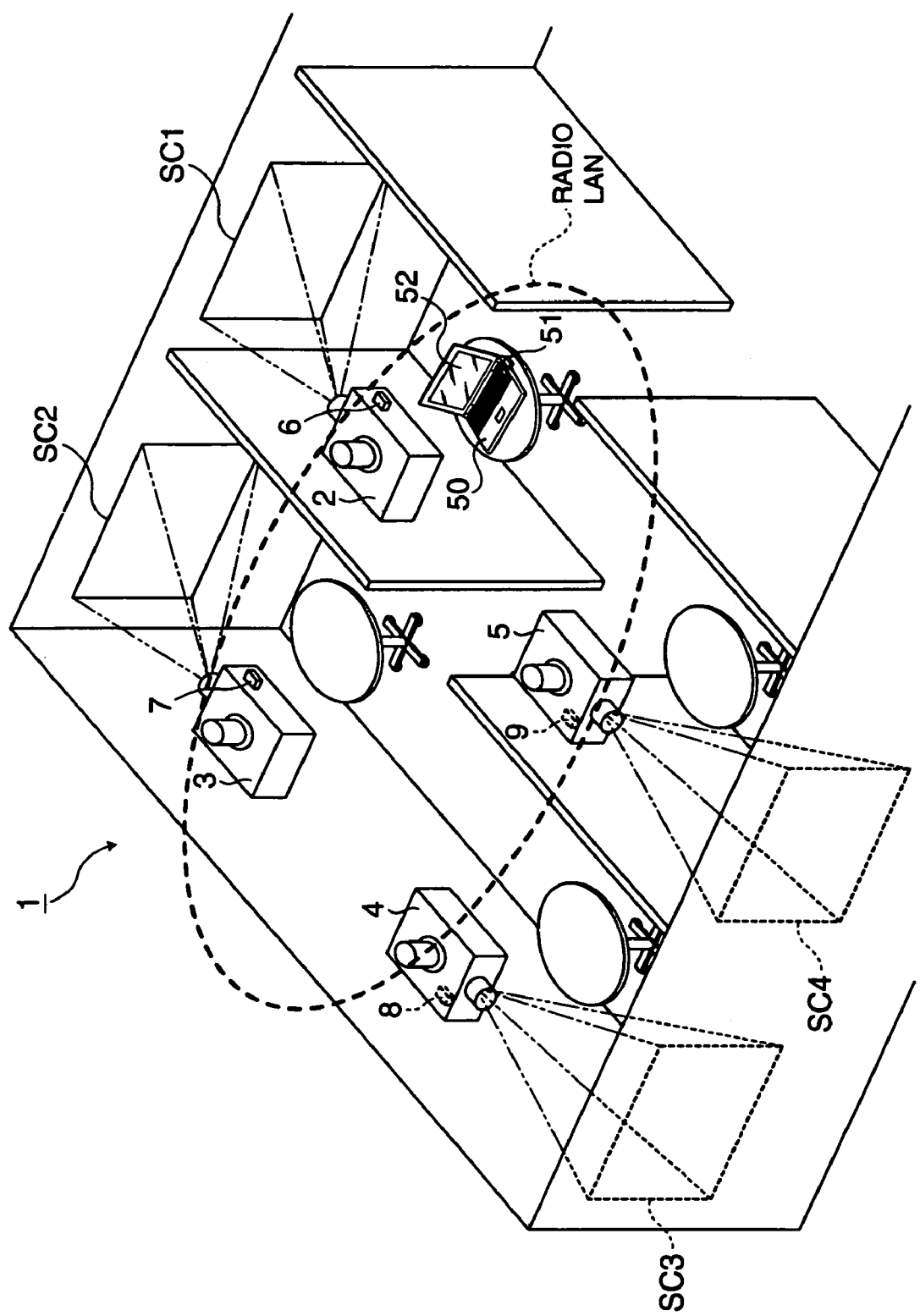
FIG. 1 is a schematic diagram of a search system for a radio LAN terminal according to an embodiment of the invention.

FIG. 1 is a schematic diagram of a search system for a radio LAN terminal in an embodiment of the invention.

A search system 1 for a radio LAN terminal includes projectors 2, 3, 4, and 5 serving as plural terminals and a personal computer (PC) 50 serving as a search computer that searches for a predetermined terminal out of the plural terminals. The projectors 2, 3, 4, and 5 are set on ceilings of meeting areas sectioned by partitions, respectively, and project meeting materials and the like on screens SC1, SC2, SC3, and SC4 provided on wall surfaces of the respective meeting areas. The PC 50 is carried into the meeting area, in which the projector 2 is set, and placed on a table.

The projectors 2, 3, 4, and 5 include communication units 6, 7, 8, and 9 serving as terminal communication units, respectively. The communication units 6, 7, 8, and 9 are radio LAN cards conforming to the IEEE 802.11b (IEEE 802.11 High-Rate Direct Sequence) radio LAN standard, respectively.

The PC 50 is a notebook personal computer and includes a PC communication unit 51 serving as a communication unit and a PC display unit 52 serving as a display unit, which is a color liquid crystal panel. The PC communication unit 51 is a radio LAN card capable of adjusting a field intensity that is transmission power of radio communication conforming to the IEEE 802.11b radio LAN standard.

The projectors 2, 3, 4, and 5 and the PC 50 are made connectable to each other by the communication units 6, 7, 8, and 9 and the PC communication unit 51 that are set in an ad hoc mode, respectively.

Schematic Constitutions of a Projector and a PC

Figure 2:
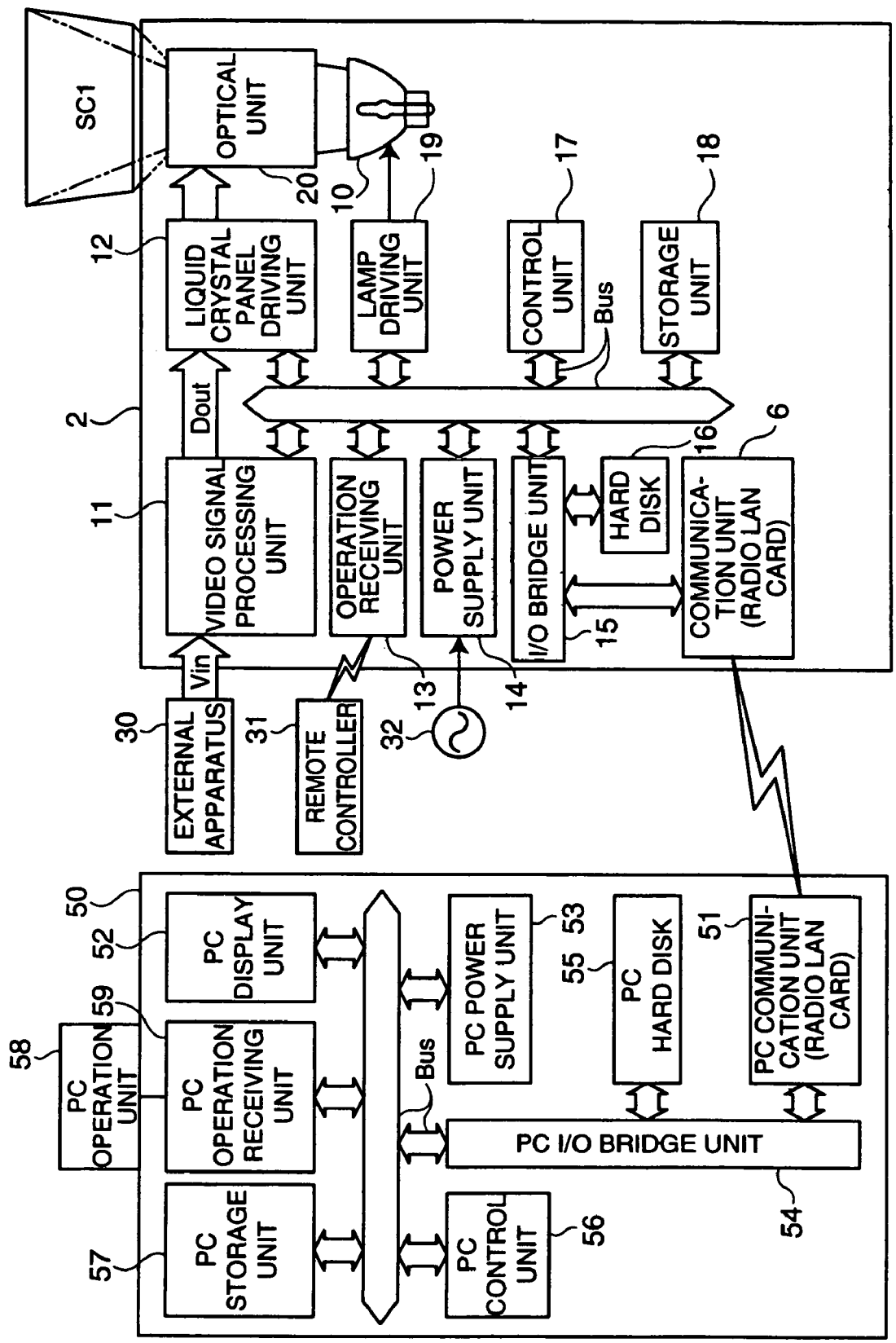
FIG. 2 is a schematic diagram of a projector and a PC.

FIG. 2 is a schematic diagram of a projector and a PC of the search system for a radio LAN terminal. The projectors 2, 3, 4, and 5 have the same constitution, although model numbers thereof are different. Thus, a constitution of the projector 2 will be explained as a representative constitution.

The projector 2 is a so-called "liquid crystal three-plate projector" that separates light radiated by a lamp 10 serving as a light source into three primary color components of light of red light, blue light, and green light, modulates the respective color lights with liquid crystal light bulbs for the respective color lights serving as optical modulators included in an optical unit 20 according to a video signal from an external apparatus 30 such as a PC, and combines the color lights again to project a video on the screen SC1.

The projector 2 includes an operation panel (not shown) serving as an operation unit including plural operation buttons for operating the projector 2 on an upper surface of a body of the projector 2. However, since the projector 2 is set on the ceiling as shown in FIG. 1, the projector 2 is remotely operated by a remote controller 31 including plural operation buttons same as those of the operation panel.

In addition to the communication unit 6, the projector 2 includes the lamp 10, a video signal processing unit 11, a liquid crystal panel driving unit 12, an operation receiving unit 13, a power supply unit 14, an I/O bridge unit 15, a hard disk 16, a control unit 17, a storage unit 18, a lamp driving unit 19, and the optical unit 20.

The lamp 10 is, for example, a discharge lamp that can obtain high luminance such as a high pressure mercury lamp, a metal halide lamp, or a halogen lamp.

The video signal processing unit 11 includes, to make it possible to apply various kinds of video signal processing described later to an analog video signal Vin supplied from the external apparatus 30, a video converter (not shown) that subjects the video signal Vin to A/D conversion processing for converting the video signal Vin from an analog signal to a digital signal.

The video signal processing unit 11 performs video signal processing for, for example, writing video data in a video memory (both the video data and the video memory are not shown) and reading out the video data under a predetermined condition and outputs the video data as a digital video signal Dout in order to change a video signal converted into a digital signal to a signal suitable for display with the liquid crystal light bulbs. The video signal processing includes scaling processing for adjusting a video represented by the video signal to resolution of the liquid crystal light bulbs by enlarging and reducing the video, γ correction processing for converting a gradation value of the video signal into a gradation value suitable for display with the liquid crystal light bulbs.

The liquid crystal panel driving unit 12 supplies the video signal Dout inputted from the video signal processing unit 11, a driving voltage, and the like to the liquid crystal light bulbs (not shown) and projects a video on the liquid crystal light bulbs.

When operation is applied to the operation unit such as the remote controller 31, the operation receiving unit 13 receives the operation and sends operation signals serving as triggers for various operations to the control unit 17.

The power supply unit 14 leads, from a plug, AC power from an external power supply 32 and applies processing such as transformation, rectification, and smoothing to the AC power in an AC/DC conversion unit (both the plug and the AC/DC conversion unit are not shown) built in the power supply unit 14 to supply a stabilized DC voltage to the respective units of the projector 2.

The I/O bridge unit 15 is a south bridge and mounted with various device controllers such as a card controller conforming to the Personal Computer Memory Card International Association (PCMCIA) for controlling the radio LAN card of the communication unit 6 and an Integrated Drive Electronics (IDE) controller for controlling the hard disk 16.

The hard disk 16 is a hard disk conforming to the IDE and has stored therein a browser for web page inspection and plural programs such as plug-in for adding a function for reproducing Audio visual (AV) data including video and sound signals. Consequently, the projector 2 can store, for example, AV data downloaded from the Internet via the communication unit 6 in the hard disk 16 and reproduce and project the AV data with the projector 2 alone.

The control unit 17 is a Central Processing Unit (CPU) and exchanges signals with the respective units via a bus line Bus. For example, when the communication unit 6 receives a probe request, the control unit 17 causes the communication unit 6 to transmit identification information including an identifier such as an IP address for identifying the projector 2 together with a response signal.

The storage unit 18 includes a nonvolatile memory capable of rewriting data such as a flash memory. Various programs for controlling operations of the projector 2 such as a start routine in starting the projector 2 and various protocol programs for performing communication using the communication unit 6 and data incidental to the programs are stored in the storage unit 18. These programs and data may be stored in the hard disk 16.

The lamp driving unit 19 includes an igniter circuit that receives power supply from the power supply unit 14 and generates a high voltage to form a discharge path in order to light a lamp 10, which is a discharge lamp, and a ballast circuit for maintaining a stable lighting state after the lighting (both the igniter circuit and the ballast circuit are not shown).

The optical unit 20 includes an integrator optical system that converts white light radiated by the lamp 10 into substantially parallel beams with stable luminance distribution, a separation optical system that separates the white light with stable luminance distribution into respective color light components the three primary colors of light, red, green, and blue, and supplies respective color lights to the liquid crystal light bulbs for the respective color lights, and a combination optical system that combines the respective color lights, which are modulated according to the video signal Dout by the liquid crystal light bulbs, again (all the integrator optical system, the separation optical system, and the combination optical system are not shown).

The optical unit 20 projects a full color video on the screen SC using projected beams obtained by magnifying full-color substantially parallel modulated beams emitted from the combination optical system with a projection lens built in the optical unit 20.

Subsequently, a schematic constitution of the PC 50 will be explained.

The PC 50 includes, in addition to the PC communication unit 51 and the PC display unit 52, a PC power supply unit 53, a PC I/O bridge unit 54, a PC hard disk 55, a PC control unit 56, a PC storage unit 57, a PC operation unit 58, and a PC operation receiving unit 59. In order to distinguish the components of the PC 50 from the component names of the projector 2, "PC" is affixed to the components of the PC 50.

The PC power supply unit 53 is, for example, a rechargeable lithium ion battery and stores electric power supplied from an external power supply and supplies a DC voltage to the respective units of the PC 50.

The PC I/O bridge unit 54 is a south bridge and mounted with a card controller conforming to the PCMCIA for controlling the radio LAN card of the PC communication unit 51 and various device controllers such as an IDE controller for controlling the PC hard disk 55.

The PC hard disk 55 is a hard disk conforming to the IDE and stores programs such as an Operating system (OS) serving as basic software, a browser, and various kinds of business software used for document preparation and presentation.

The PC control unit 56 is a Central Processing Unit (CPU) and controls exchange of signals with the respective unit and operations of the respective units.

The PC storing unit 57 includes a nonvolatile memory capable of rewriting data such as a flash memory. Various programs for controlling operations of the PC 50 such as a search program for searching for a nearest connectable terminal, a connection program for making connection to searched terminals, and various protocol programs for performing communication using the PC communication unit 51 and data incidental to the programs are stored in the PC storage unit 57. The incidental data include, for example, a search list of identification information including identifier of the terminals searched by the search program. The search list is set to erase stored contents at the time of previous search when the search program is executed. These programs and data may be stored in the PC hard disk 55.

The PC operation unit 58 includes a keyboard and a mouse. For example, operation for starting the PC 50 or displaying a material for presentation is applied to the keyboard.

When operation is applied to the PC operation unit 58, the PC operation receiving unit 59 receives the operation and sends operation signals serving as triggers for various operations to the PC control unit 56.

Search for a Terminal in the Vicinity

Figure 3:
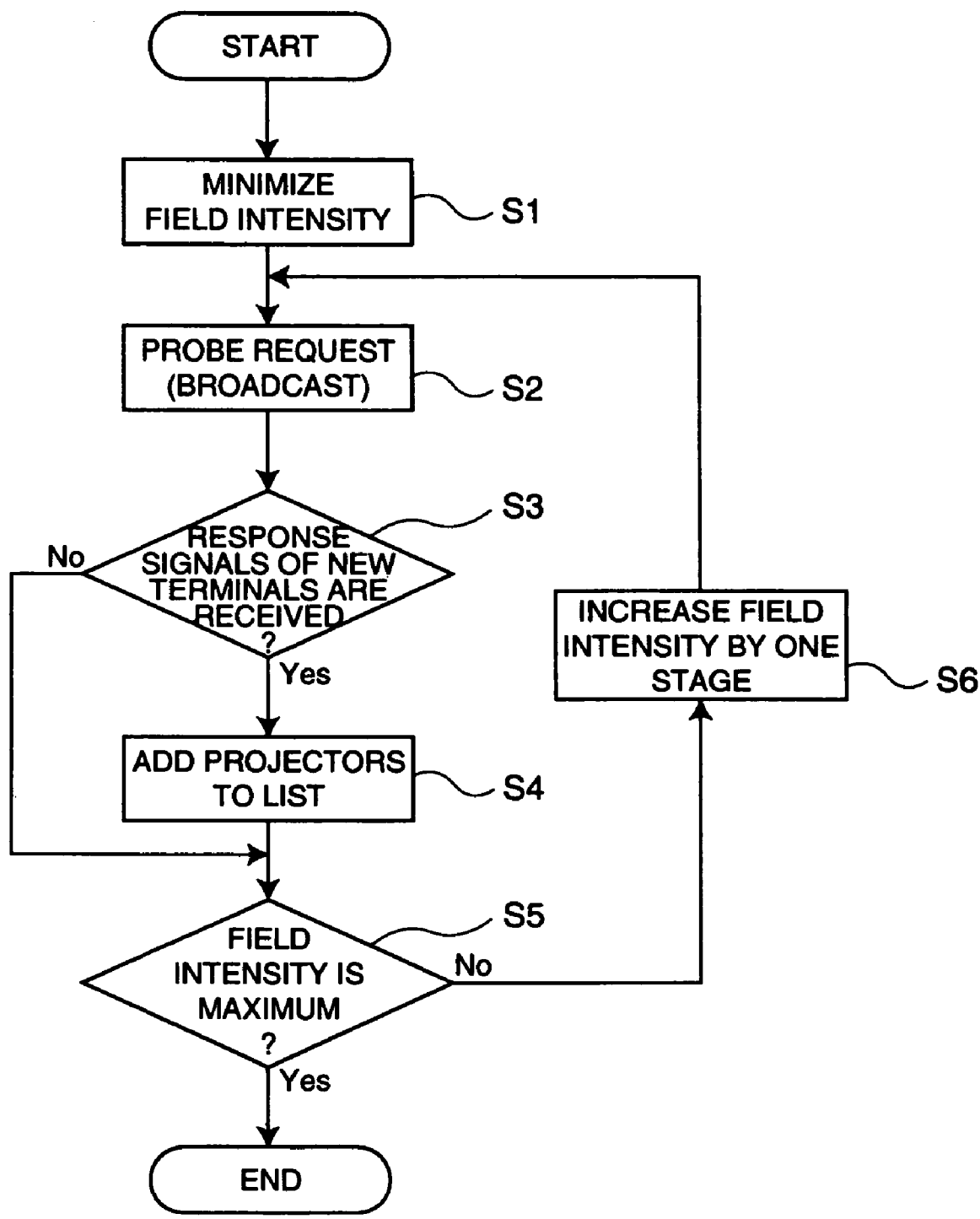
FIG. 3 is a flowchart of search processing for a terminal.

FIG. 3 is a flowchart showing a flow of search processing for searching for a connectable terminal in the vicinity. A search method for a terminal near the PC 50 will be hereinafter explained with reference mainly to FIG. 3 and with reference to FIGS. 1 and 2 according to circumstances.

In FIG. 1, the PC 50 executes a search program for searching for a nearest connectable terminal stored in the PC storage unit 57 in order to have a meeting using the projector 2 that is a terminal nearest to the PC 50 in the meeting area in which the projector 2 is set.

In step S1, the PC control unit 56 sets a field intensity of radio communication of the PC communication unit 51 to a minimum value. Step S1 corresponds to the radio power setting step.

In step S2, the PC control unit 56 broadcasts a probe request for searching for a terminal using the PC communication unit 51. Step S2 corresponds to the searching step.

In step S3, the PC control unit 56 judges whether response signals from terminals including identification information such as identifiers of the terminals transmitted in response to the probe request are response signals of new terminals not stored in the search list of the PC storage unit 57. When the response signals are response signals from the new terminals, the PC control unit 56 proceeds to step S4. When the response signals are not response signals from the new terminals or the response signals are not received, the PC control unit 56 proceeds to step S5. Since the response signals are response signals from the new terminals, the PC control unit 56 proceeds to step S4. Step S3 corresponds to the new terminal checking step.

In step S4, the PC control unit 56 reads identification information of the new terminals from the response signals and stores the identification information at the top of the search list of the PC storage unit 57, which indicates that the new terminals are located nearest to the PC 50. Step S4 corresponds to the listing step.

In step S5, the PC control unit 56 checks whether the field intensity of the radio communication of the PC communication unit 51 is a maximum. When the field intensity of the radio communication is the maximum, the PC control unit 56 ends the search program. When the field intensity of the radio communication is not the maximum, the PC control unit 56 proceeds to step S6. Since the field intensity of the radio communication is not the maximum, the PC control unit 56 proceeds to step S6.

In step S6, the PC control unit 56 sets the field intensity of the radio communication of the PC communication unit 51 to a value one stage higher than the field intensity and returns to step S2. Step S6 corresponds to the radio power setting step.

In step S2, the PC control unit 56 broadcasts a probe request for searching for a terminal at a field intensity higher by one state using the PC communication unit 51.

After that, the PC control unit 56 performs the search step in steps S2 to S6 until it is judged in step S5 that the field intensity is the maximum.

Figure 4A:
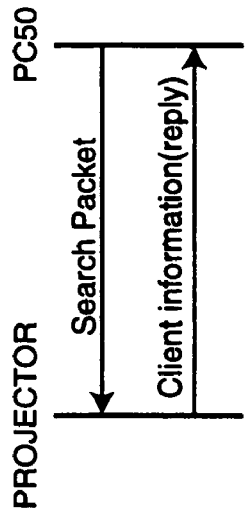
FIG. 4A is a flow diagram of a probe request and a response signal.
Figure 4B:
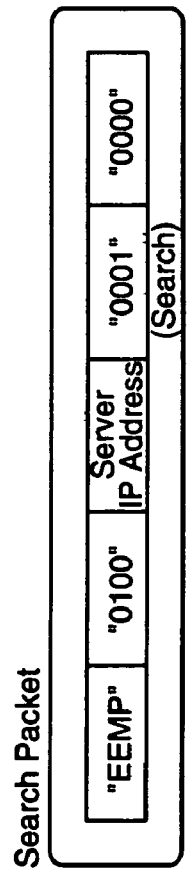
FIG. 4B is a diagram of a packet data form of the probe request.
Figure 4C:
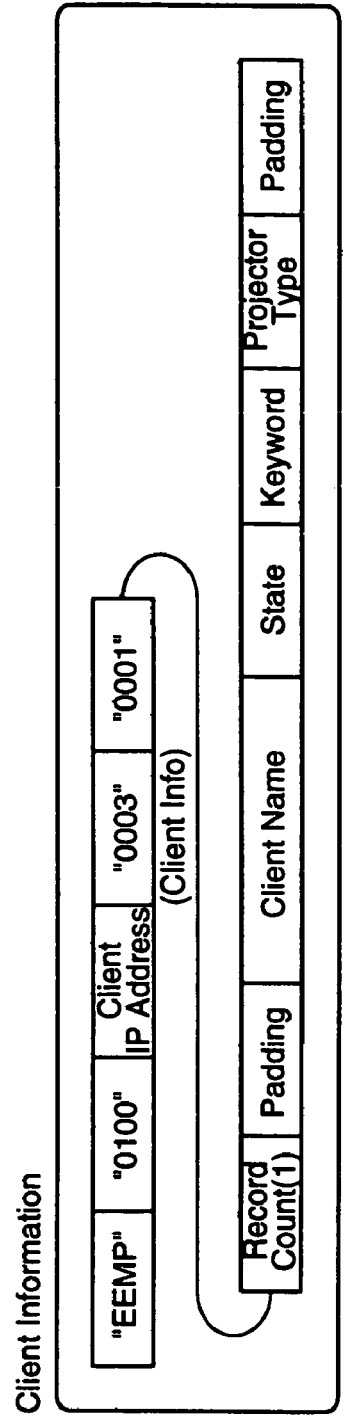
FIG. 4C is a diagram of a packet data form of the response signal.

FIG. 4A is a diagram showing a flow of a probe request and a response signal. FIGS. 4B and 4C are diagrams of forms of packet data forms of the probe request and the response signal.

In FIG. 4A, the PC 50 transmits data shown in FIG. 4B as a search packet of a probe request. A projector having received the data returns a response signal shown in FIG. 4C as client information. The response signal in FIG. 4C includes identifiers such as a "Client IP Address" and a "Client Name" serving as identification information of a terminal.

Figure 5A:
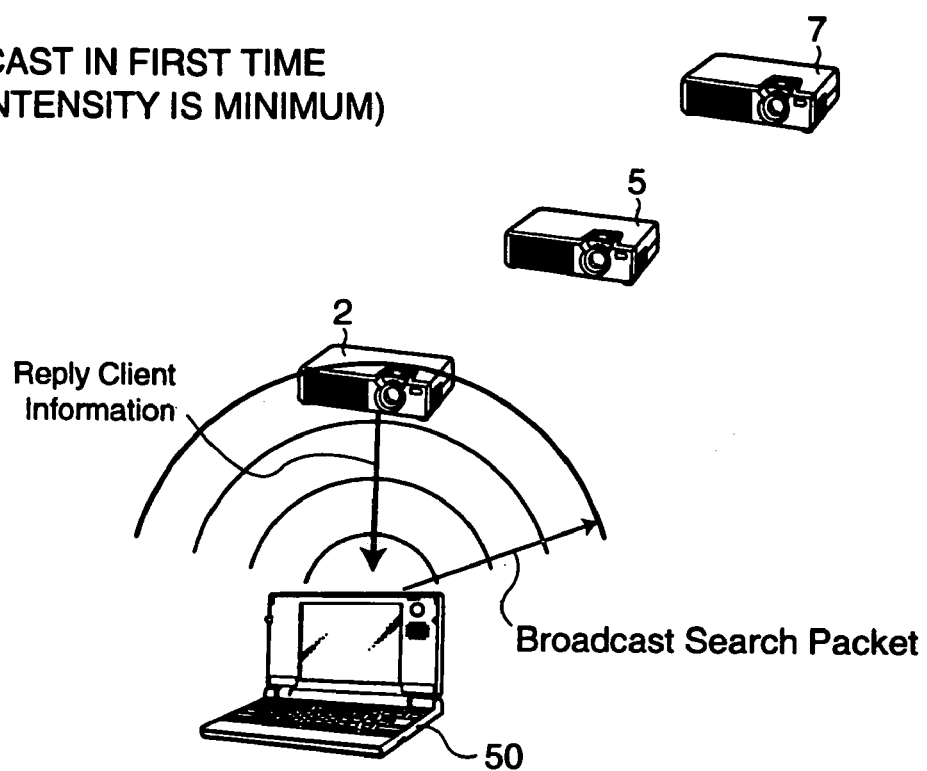
FIG. 5A is a schematic diagram showing a reaching range of a probe request according to a change in a field intensity.
Figure 5B:
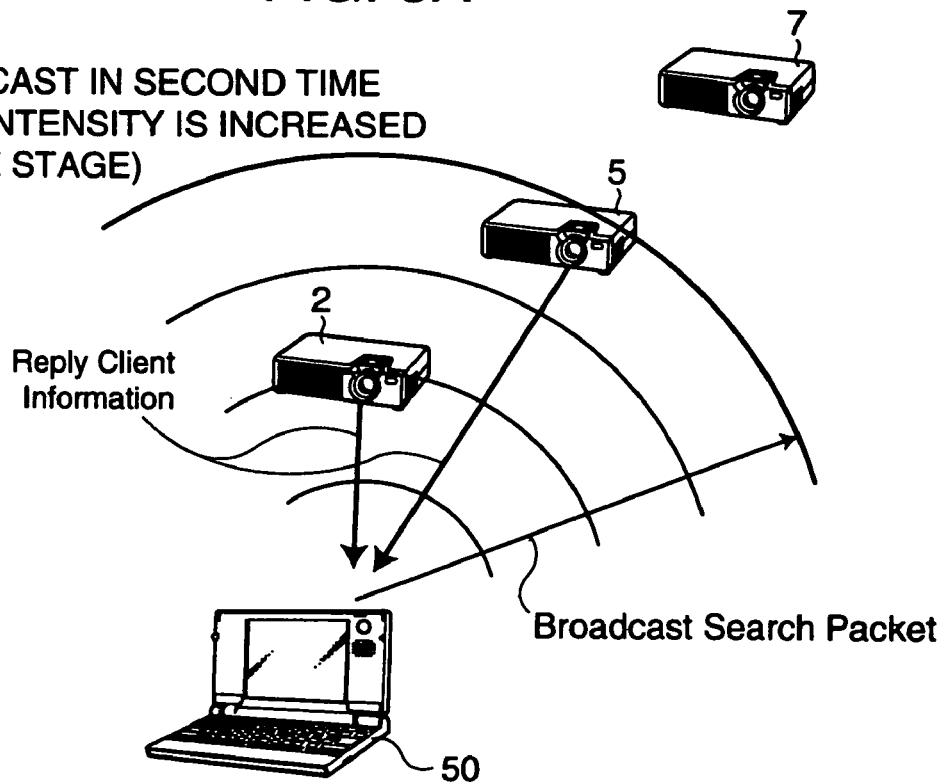
FIG. 5B is a diagram showing a reaching range of a probe request according to a change in a field intensity.

FIGS. 5A and 5B are schematic diagrams showing a reaching range of a probe request according to a change in a field intensity. FIG. 5A shows a reaching range of the probe request at the time when the field intensity is set to a minimum value. The probe request reaches the projector 2. FIG. 5B shows a reaching range of the probe request at the time when the field intensity is set one stage higher than the minimum value. The probe request reaches the projector 5. The field intensity is preferably changes in about three to five stages. Time required for the series of search in steps S1 to S6 is about several seconds.

Figure 6A:
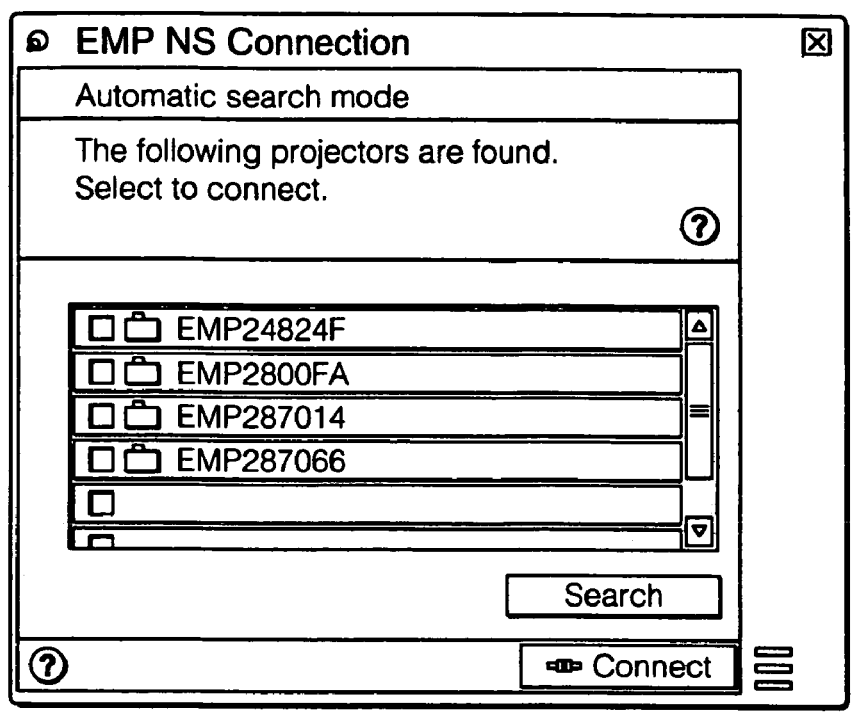
FIG. 6A is a diagram showing a form of a search list.

FIG. 6A is a diagram showing a form of a search list. Searched terminals are displayed on the PC display unit 52 of the PC 50 as the search list shown in FIG. 6A. Specifically, from the top section to the bottom section, "EMP24824F" indicting a model number of the projector 2, "EMP2800FA" indicating a model number of the projector 5, "EMP287014" indicating a model number of the projector 3, and "EMP287066" indicating a model number of the projector 4 are displayed in this order.

Only the model numbers of the projectors are displayed in the search list. However, it is also possible to display identification information such as IP addresses beside the model numbers by changing display setting. A user can connect the PC 50 and a desired terminal by selecting a terminal to which the user desires to make connection from the search list and pressing a "Connect" button on the lower right in the search list.

As described above, according to this embodiment, the following advantages are obtained.

(1) The communication units 6, 7, 8, and 9 of the projectors 2, 3, 4, and 5 include the general radio LAN cards conforming to the IEEE 802.11b radio LAN standard, respectively.

Since the general radio LAN cards are capable of adjusting transmission power of radio communication, the communication unit 51 of the PC 50 may be a general-purpose radio LAN card rather than a special radio LAN card.

Thus, a constitution required of the radio LAN terminal for joining the search system 1 is only a constitution connectable to the general-purpose radio LAN. Therefore, the search system 1 is rich in compatibility.

The PC 50 broadcasts a probe request for searching for a terminal by minimizing a set value of a field intensity of radio communication. When there are no response signals from new terminals or the response signals are not received, the PC 50 broadcasts the probe request by increasing the set value of field intensity of the radio communication of the PC communication unit 51 by one stage. Thus, the PC 50 searches for connectable terminals with a search range expanded by increasing the field intensity of the radio communication stepwise.

Since the terminals respond when the probe request is received, the terminals respond in order from one nearest to the PC 50 as a reaching range of the probe request is expanded stepwise.

Therefore, it is possible to efficiently search for a terminal nearest to the PC 50 serving as the search computer.

The search list is a list in which the searched terminals are listed according to an order of the searched terminals. Thus, the terminals are listed in order from one nearest to the search computer.

Therefore, it is possible to efficiently search for a terminal nearest to the search computer PC 50.

The search system 1 of the radio LAN terminal sends a probe request only from the search computer PC 50 at the time of search. Thus, power consumption is less.

Therefore, it is possible to provide the search system 1 for a radio LAN terminal rich in compatibility that can efficiently search for a nearest terminal out of plural terminals with less power consumption. It is also possible to provide a search method and a program for the radio LAN terminal that can efficiently search for a nearest terminal out of plural terminals.

(2) The PD display unit 52 of the PC 50 displays the search list shown in FIG. 6A. Thus, it is possible to visually recognize a search list in which searched terminals are listed in order from one nearest to the PC 50.

Therefore, it is possible to provide the search system 1 for a radio LAN terminal that can efficiently search for a nearest terminal out of plural terminals.

Second Embodiment

Connection to a Nearest Terminal

Subsequently, a second embodiment of the invention will be explained. The second embodiment relates to a method of searching for a terminal nearest to the search PC 50 and making connection to the nearest terminal searched using the search system 1 for a radio LAN terminal in the first embodiment.

Figure 7:
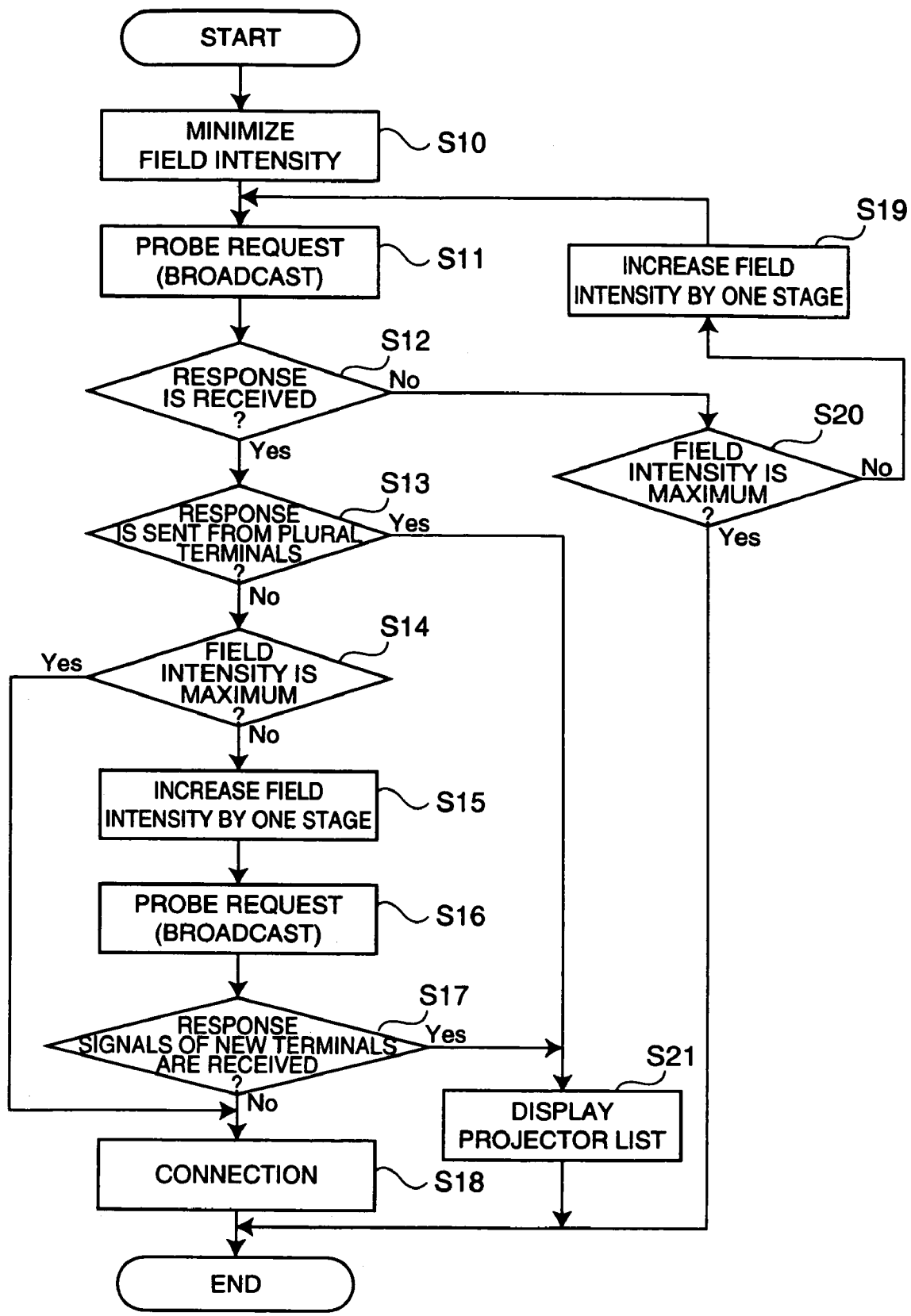
FIG. 7 is a flowchart of processing for searching for and making connection to a terminal.

FIG. 7 is a flowchart showing a flow of processing for searching for a nearest connectable terminal and making connection to the terminal. A method of searching for and making connection to a nearest terminal will be hereinafter explained with reference mainly to FIG. 7 and with reference to FIGS. 1 and 2 according to circumstance.

In FIG. 1, the PC 50 executes a connection program for searching for a nearest connectable terminal stored in the PC storage unit 57 and making connection to the terminal searched in order to make connection to the projector 2 serving as the terminal nearest to the PC 50 in the meeting area in which the projector 2 is set.

In step S10, the PC control unit 56 sets a field intensity of radio communication of the PC communication unit 51 to a minimum value. Step S10 corresponds to the radio power setting step.

In step S11, the PC control unit 56 broadcasts a probe request for searching for terminals using the PC communication unit 51. Step S11 corresponds to the searching step.

In step S12, the PC control unit 56 judges presence or absence of a response from terminals responding to the probe request according to presence or absence of a response signal from the terminals. When the response signal is not received, the PC control unit 56 proceeds to step S20. When the response signal is received, the PC control unit 56 proceeds to step S13. Since the response signal is received, the PC control unit 56 proceeds to step S13. Step S12 corresponds to the new terminal checking step.

In step S13, the PC control unit 56 judges according to the number of received response signals whether the response from the terminals is sent by plural terminals. When the plural response signals are received, the PC control unit 56 proceeds to step S21. When one response signal is received, the PC control unit 56 proceeds to step S14. Since one response signal is received, the PC control unit 56 proceeds to step S14.

In step S14, the PC control unit 56 checks whether the field intensity of the radio communication of the PC communication unit 51 is a maximum. When the field intensity of the radio communication is the maximum, the PC control unit 56 proceeds to step S18. When the field intensity of the radio communication is not the maximum, the PC control unit 56 proceeds to step S15. Since the field intensity of the radio communication is not the maximum, the PC control unit 56 proceeds to step S15.

In step S15, the PC control unit 56 sets the field intensity of the radio communication of the PC communication unit 51 to a value higher one stage higher than the field intensity. Step S15 corresponds to the radio power setting step.

In step S16, the PC control unit 56 broadcasts a probe request for searching for a terminal using the PC communication unit 51. Step S16 corresponds to the searching step.

In step S17, the PC control unit 56 judges whether response signals from the terminals transmitted in response to the probe request are response signals from new terminals not stored in the search list of the PC storage unit 57. When the response signals are response signals from the new terminals, the PC control unit 56 proceeds to step S21. When the response signals are not response signals from the new terminals or the response signals are not received, the PC control unit 56 proceeds to step S18. Since the response signals are not response signals from the new terminals, the PC control unit 56 proceeds to step S18. Step S17 corresponds to the new terminal checking step.

In step S18, the PC control unit 56 makes connection to one terminal stored in the search list using the PC communication unit 51 via the radio LAN. Step S18 corresponds to the connection step.

Subsequently, processing at the time when the response signals are not received in step S12 will be explained.

In step S20, the PC control unit 56 checks whether the field intensity of the radio communication of the PC communication unit 51 is the maximum. When the field intensity of the radio communication is the maximum, since a terminal capable of responding to the probe request is not present in a searchable range, the PC control unit 56 ends the search. When the field intensity of the radio communication is not the maximum, the PC control unit 56 proceeds to step S19. Since the field intensity of the radio communication is not the maximum, the PC control unit 56 proceeds to step S19.

In step S19, the PC control unit 56 sets the field intensity of the radio communication of the PC communication unit 51 to a value one stage higher than the field intensity and returns to step S11. Step S19 corresponds to the radio power setting step.

Subsequently, processing at the time when plural response signals are received in step S13 and when the response signals are response signals from the new terminals in step S17 will be explained.

In step S21, since there are plural terminals searched, the PC control unit 56 displays the search list shown in FIG. 6A on the PC display unit 52 without performing the connection processing.

Figure 6B:
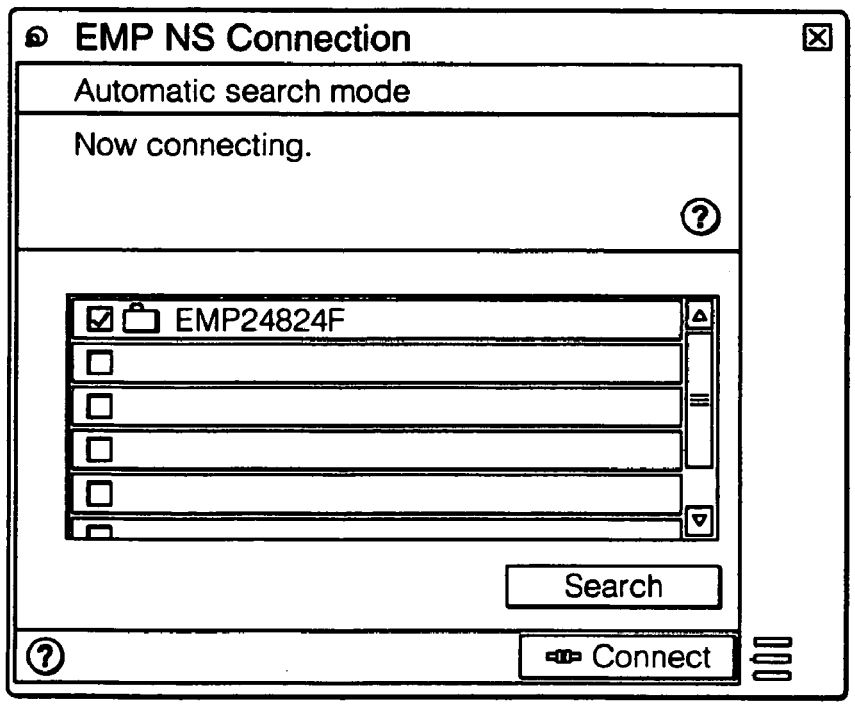
FIG. 6B is a diagram showing a form of a state of connection with searched terminals.

FIG. 6B is a diagram showing a form of a state of connection with a terminal searched. In step S18, the searched one terminal is automatically connected to the PC 50 by the PC 50 via the radio LAN as shown in FIG. 6B. Specifically, "EMP24824F" that is a model number of the projector 2 is selected and an indication of "now connecting" is displayed.

It is also possible to always display the indication of the search and connection state shown in FIG. 6B during a search operation or not to display the indication at all according to display setting.

As described above, according to the second embodiment, the following advantages are obtained in addition to the advantages in the first embodiment.

(1) When there is one connectable terminal, the PC 50 sends a probe request by increasing the field intensity of the radio communication by one stage. When the response signals are not response signals from the new terminals or the response signals are not received, the PC 50 makes connection to the one terminal. Thus, the PC 50 makes connection when a terminal nearest to the PC 50 can be surely limited.

Therefore, it is possible to provide a search system, a search method, and a program for a radio LAN terminal that can surely search for and make connection to a nearest terminal out of plural terminals.

The invention is not limited to the embodiments described above. It is possible to apply various modifications and improvements to the embodiments. Modifications will be described below.

First Modification

A first modification will be explained with reference to FIGS. 1 and 2. In the embodiments, it is explained that the search computer PC 50 executes the search program. However, a terminal may execute the search program. For example, the search program is stored in the storage unit 18 or the hard disk 16 of the projector 2 serving as the terminal and the search program is executed according to operation of the remote controller 31. In this case, the search list is displayed on the screen SC1 according to an On Screen Display (OSD) function for superimposing the search list shown in FIG. 6A on a projected video by the video signal processing of the video signal processing unit 11.

Consequently, it is possible to efficiently search for a nearest terminal or computer out of plural terminals.

Second Modification

In the embodiments, it is explained that the search system 1 for a radio LAN terminal is used in an environment conforming to the IEEE 802.11b radio LAN standard. However, an environment in which the search system 1 for a radio LAN terminal is used is not limited to this. For example, the search system 1 for a radio LAN terminal may be used in a radio LAN environment conforming to the IEEE. 802.11a or IEEE 802.11g standard. In this way, in a radio LAN environment using a radio wave, it is possible to apply the search system, the search method, and the program for a radio LAN terminal and obtain the same advantages as the embodiments.

Third Modification

In the embodiments and the modification described above, it is explained that the projectors 2, 3, 4, and 5 serving as terminals are the liquid crystal three-plate projector using three liquid crystal light bulbs as optical projectors. However, the projectors are not limited to this. For example, as the optical modulators of the projectors, a single-plate liquid crystal liquid crystal light bulb including liquid crystal cells of the same number as resolutions for respective color lights in which red, blue, and green color filters are regularly arranged in a lattice shape may be used. A reflection liquid crystal display device or a tilt mirror device may be used. With these devices, it is also possible to obtain the same advantages as the embodiments and the modifications described above.

Fourth Modification

In the embodiments and the modifications described above, it is explained that the terminal is the projector. However, the terminal is not limited to this. For example, the terminal may be a printer with a radio LAN card inserted therein or a multifunction apparatus in which a printer and a copying machine are combined. In the terminal including a device connectable to a radio LAN, it is possible to apply the search system, the search method, and the program for a radio LAN terminal and obtain the same advantages as the embodiments.

What is claimed is:

1. A search system for a radio LAN, comprising:
a plurality of terminals; and
a search computer that searches for connectable terminals of the plurality of terminals that are connectable to the search computer, the search computer including:
a main communication unit capable of changing transmission power for performing radio communication via the radio LAN with the plurality of terminals; and
a storage unit that stores a search list in which identification information including identifiers, for identifying searched terminals that have been searched, are listed according to an order of the searched terminals,
the plurality of terminals including terminal communication units for performing radio communication with the search computer via the radio LAN,
the search computer broadcasting a probe request for searching for the connectable terminals that are connectable by minimizing a set value of the transmission power of the radio communication of the main communication unit,
the connectable terminals having received the probe request transmitting response signals, including identification information from the terminal communication units to the search computer,
the search computer checking whether received response signals are response signals from new terminals that are not stored in the search list,
the search computer adding, when the received response signals are from the new terminals, the identification information included in the response signals to the search list,
the search computer performing, when the received response signals are not from the new terminals or the response signals are not received, a series of search operations including the probe request by increasing the set value of the transmission power of the radio communication of the main communication unit, the series of search operations including transmitting the response signals, checking whether the received response signals are from other new terminals not stored in the search list, adding the identification information from the other new terminals when the received response signals are from the other new terminals, and repeating the series of search operations when the received response signals are not from the other new terminals, and the search computer automatically establishing a connection to a single connectable terminal stored in the search list via the radio LAN when (i) the search list has no connectable terminal stored prior to a current search operation, the current search operation results in only a single received response signal from a new terminal which is then added to the search list, and the set value of the transmission power of the radio communication of the main communication unit for the current search operation is set to a maximum value, and (ii) the search list has no connectable terminal stored prior to the current search operation, the current search operation results in only a single received response signal from a new terminal which is then added to the search list, and a next search operation performed after increasing the set value of the transmission power of the radio communication of the main communication unit results in no response signal other than from the single terminal on the search list.

2. The search system for a radio LAN according to claim 1, the search computer further including a display unit that displays the search list.

3. A search method for use with a radio LAN for searching for terminals of a plurality of terminals that are connectable, the search method for the radio LAN comprising:
a radio power setting step for setting transmission power of radio communication for searching for the terminals of the plurality of terminals that are connectable;
a searching step for searching for the connectable terminals by broadcasting a probe request for the connectable terminals at the transmission power set in the radio power setting step;
a new terminal checking step for checking whether received response signals, indicating that terminals are connectable sent from the terminals responding to the probe request transmitted in the searching step, are response signals from new terminals not stored in a search list in which the searched terminals are listed;
a listing step for additionally listing, when the received response signals are from the new terminals, in the new terminal checking step, identification information included in the response signals for identifying the responding new terminals in the search list, wherein
in the radio power setting step and the searching step, the probe request is started from a minimum set value of the transmission power of the radio communication, and in the new terminal checking step, when the received response signals responding to the probe request transmitted in the searching step are not response signals from the new terminals or the response signals are not received, a series of search operations including the searching step are performed by increasing the set value of the transmission power of the radio communication in the radio power setting step, and
a connection is automatically established to a single connectable terminal stored in the search list via the radio LAN when (i) the search list has no connectable terminal stored prior to a current search operation, the current search operation results in only a single received response signal from a new terminal which is then added to the search list, and the set value of the transmission power of the radio communication of the main communication unit for the current search operation is set to a maximum value, and (ii) the search list has no connectable terminal stored prior to the current search operation, the current search operation results in only a single received response signal from a new terminal which is then added to the search list, and a next search operation performed after increasing the set value of the transmission power of the radio communication of the main communication unit results in no response signal other than from the single terminal on the search list.

4. The search method for a radio LAN according to claim 3, the search list being a list in which pieces of identification information indicating the searched terminals are listed in an order of the searched terminals.

5. A computer program product comprising a computer readable medium having encoded thereon a search program for a radio LAN in a radio LAN system having a plurality of terminals and a search computer, the search program directing the search computer to search for connectable terminals out of the plurality of terminals by performing the operations of:

a radio power setting program for setting transmission power of radio communication for searching terminals of the plurality of terminals that are connectable;

a searching program for searching for the connectable terminals by broadcasting a probe request for a communication unit to search for the connectable terminals with the transmission power set in the radio power setting program;

a new terminal checking program for checking whether received response signals, indicating that terminals are connectable sent from the terminals responding to the probe request transmitted in the searching program, are response signals from new terminals not stored in a search list of a storage unit in which the searched terminals are listed;

a listing program for additionally listing, when the received response signals are from the new terminals, in the new terminal checking program, identification information included in the response signals for identifying the responding new terminals in the search list, wherein in the radio power setting program and the searching program, the probe request is started from a minimum set value of the transmission power of the radio communication and, in the new terminal checking program, when the received response signals responding to the probe request transmitted in the searching program are not response signals from the new terminals or the response signals are not received, a series of search operations including the searching program are performed by increasing the set value of the transmission power of the radio communication in the radio power setting program, and a connection is automatically established to a single connectable terminal stored in the search list via the radio LAN when (i) the search list has no connectable terminal stored prior to a current search operation, the current search operation results in only a single received response signal from a new terminal which is then added to the search list, and the set value of the transmission power of the radio communication of the main communication unit for the current search operation is set to a maximum value, and (ii) the search list has no connectable terminal stored prior to the current search operation, the current search operation results in only a single received response signal from a new terminal which is then added to the search list, and a next search operation performed after increasing the set value of the transmission power of the radio communication of the main communication unit results in no response signal other than from the single terminal on the search list.

6. The computer program product according to claim 5, the search list being a list in which pieces of identification information indicating the searched terminals are listed in an order of the searched terminals.

* * * * *